United States Patent
Alfano et al.

(10) Patent No.: US 7,821,927 B2
(45) Date of Patent: Oct. 26, 2010

(54) METHODS AND APPARATUS FOR REDUCING UNDELIVERABLE SERVER-INITIATED IP TRAFFIC IN A WIRELESS NETWORK

(75) Inventors: Nicholas P. Alfano, Vancouver (CA); Adrian Buckley, Tracy (CA); Noushad Naqvi, Waterloo (CA); Ian M. Patterson, Petersburg (CA); Gary P. Mousseau, Waterloo (CA); Allan David Lewis, New Dundee (CA); Hugh Hind, Waterloo (CA); Graeme R. S. Whittington, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 227 days.

(21) Appl. No.: 12/048,746

(22) Filed: Mar. 14, 2008

(65) Prior Publication Data

US 2008/0159257 A1     Jul. 3, 2008

Related U.S. Application Data

(63) Continuation of application No. 10/839,388, filed on May 5, 2004, now Pat. No. 7,366,093.

(60) Provisional application No. 60/468,451, filed on May 7, 2003.

(51) Int. Cl.
*H04L 12/26* (2006.01)
*H04L 1/00* (2006.01)

(52) U.S. Cl. .................. 370/229; 370/253; 370/310; 370/349; 370/231; 370/313; 455/412.2; 455/412.1; 455/403

(58) Field of Classification Search .......... 370/229, 370/242, 253, 310, 349, 230, 231, 235, 236, 370/312, 313
See application file for complete search history.

(56) References Cited

U.S. PATENT DOCUMENTS 6,111,866 A    8/2000   Kweon et al.

(Continued)

FOREIGN PATENT DOCUMENTS

WO    0217664 A1    2/2002

OTHER PUBLICATIONS

International Preliminary Report On Patentability for International Application No. PCT/CA2004/000678 Aug. 23, 2005.

(Continued)

*Primary Examiner*—Huy Phan
(74) *Attorney, Agent, or Firm*—John J. Oskorep, Esq.

(57) ABSTRACT

A host server is operative to control the pushing of user data messages to a plurality of mobile communication devices adapted to communicate in a wireless communication network. In particular, the host server is adapted to cause, for each one of the mobile communication devices operating in the wireless communication network, user data messages to be pushed to a mobile communication device via a packet data connection; receive, from a serving node in the wireless communication network, an IP notification message having an IP destination address of the host server and including an identification or address that identifies one of the mobile communication devices, the IP notification message being produced in response to a termination of packet data connectivity for the identified mobile communication device; and in response to receiving the IP notification message, at least temporarily refrain from pushing user data messages to the identified mobile communication device. The IP notification message may be formatted and communicated based on an existing protocol, such as Internet Control Message Protocol (ICMP), or any other suitable protocol.

24 Claims, 4 Drawing Sheets

U.S. PATENT DOCUMENTS

| | | | | |
|---|---|---|---|---|
| 6,366,792 | B1* | 4/2002 | Katsuki | 455/572 |
| 6,418,128 | B1* | 7/2002 | Takagi et al. | 370/328 |
| 7,336,941 | B1* | 2/2008 | Clingerman et al. | 455/404.1 |
| 7,339,892 | B1* | 3/2008 | Engwer et al. | 370/235 |
| 2001/0014085 | A1* | 8/2001 | Johansson et al. | 370/329 |
| 2002/0194331 | A1* | 12/2002 | Lewis et al. | 709/224 |
| 2003/0065816 | A1 | 4/2003 | Dharmadhikari et al. | |
| 2003/0083045 | A1* | 5/2003 | Blight et al. | 455/412 |
| 2003/0095540 | A1* | 5/2003 | Mulligan et al. | 370/352 |
| 2003/0169704 | A1* | 9/2003 | Okanoue | 370/328 |
| 2003/0218996 | A1 | 11/2003 | Sumino et al. | |
| 2003/0224820 | A1 | 12/2003 | Einola et al. | |
| 2004/0052212 | A1* | 3/2004 | Baillargeon | 370/235 |
| 2004/0192252 | A1 | 9/2004 | Aerrabotu et al. | |
| 2006/0023676 | A1 | 2/2006 | Whitmore et al. | |
| 2006/0030299 | A1 | 2/2006 | Wandel | |

OTHER PUBLICATIONS

International Search Report and Written Opinion for patent application PCT/CA2004/000678 Aug. 16, 2004.

Push OTA Protocol Version Apr. 25, 2001, Wireless Application Protocol WAP-235-PushOTA-20010425a, Wireless Application Protocol Forum Ltd., 1999-2001.

Push Access Protocol Version Apr. 29, 2001, Wireless Application Protocol WAP-247-PAP-20010429-a, Wireless Application Protocol Forum Ltd.,1999-2001.

3rd Generation Partnership Project Technical Specification Group Services and System Aspects Support of Push Service (Release 5), Mar. 2002.

A Location-based Push Architecture using SIP, Forschungszentrum Telekommunikation Wien (FTW), Pospischil et al., Sep. 9, 2001.

3GPP TR 23.875 V5. 1.0 (Mar. 2002), figure 7.2.4.1, The UE Goes out of coverage, figure7.2.4.2, PDP Context Deactivation due to Detach Operation, figure 7.2.4.2, GGSN initiated PDP context deactivation.

3rd Generation Partnership Project; Technical Specification Group Services and System Aspects Push Architecture (Release 6), 2004.

3GPP TSG-SA WG2 #32, PDP Context State Notifications Using ICMP, May 12-16, 2003.

European Search Report, Aug. 6, 2008, EPO Application No. 08158904.6.

* cited by examiner

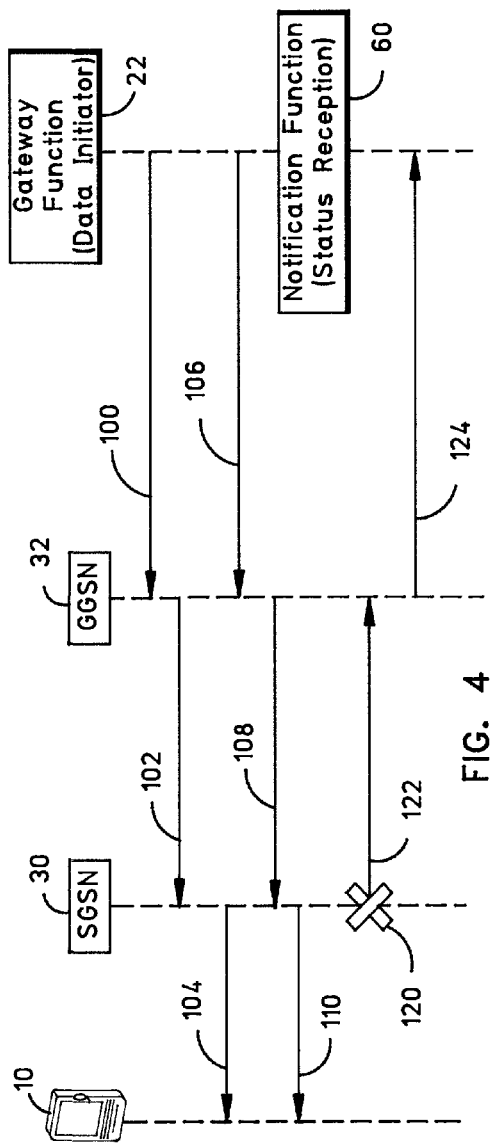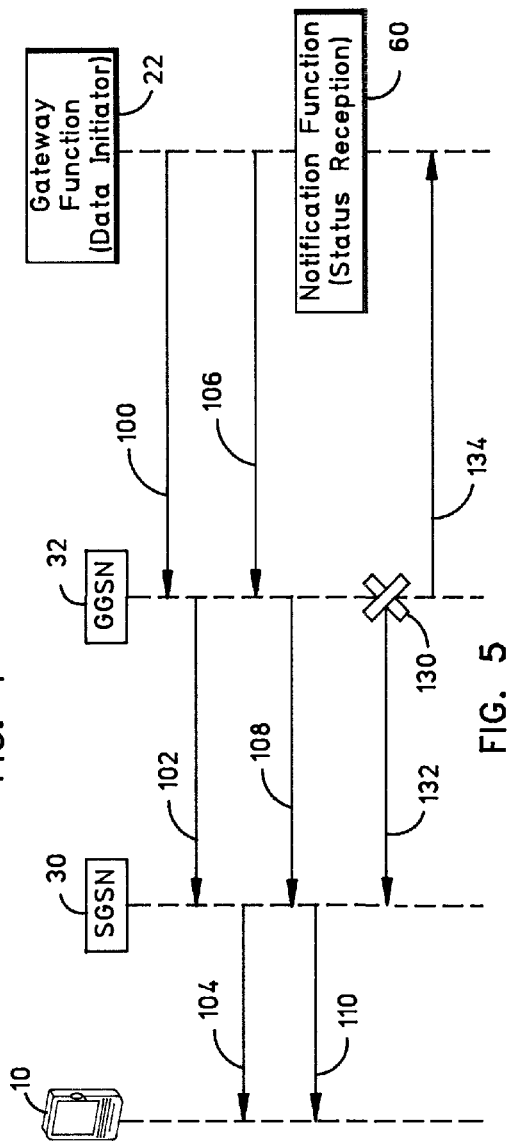

METHODS AND APPARATUS FOR REDUCING UNDELIVERABLE SERVER-INITIATED IP TRAFFIC IN A WIRELESS NETWORK

CROSS-REFERENCE TO RELATED APPLICATIONS

The present application is a continuation of and claims priority to U.S. non-provisional patent application entitled "Methods And Apparatus For Reducing Undeliverable Server-Initiated IP Traffic In A Wireless Network" having application Ser. No. 10/839,388 and filing date of 5 May 2004, now U.S. Pat. No. 7,366,093, which claims further priority to U.S. Provisional Patent Application entitled "Control Information" having application No. 60/468,451 and filing date of 7 May 2003, which application being hereby incorporated by reference herein.

BACKGROUND

1. Field of the Technology

The present application relates generally to wireless communication networks, and more particularly to methods and apparatus for reducing undeliverable server-initiated IP traffic to mobile stations in a wireless communication network.

2. Description of the Related Art

Internet Protocol (IP) communication networks were originally implemented in land-line environments. Over the past decade, however, emerging wireless networks have been designed with at least some form of IP protocol support. Wireless networks operating in accordance with General Packet Radio Service (GPRS), for example, have been specified to offer a form of native IP networking. In general, GPRS utilizes a series of data-centric network protocols which operate in conjunction with traditional Global Systems for Mobile Communication (GSM) networks.

Networks like those based on GSM/GPRS utilize proprietary tunneling techniques for creating IP-based addressing mechanisms that work over the top of traditional network infrastructure protocols that are not IP-based. In the case of GSM/GPRS, an IP tunnel is utilized which is referred to as a Packet Data Protocol (PDP) Context. A PDP Context utilizes a tunneling service on behalf of two entities, communicating only using native IP packets. The creation of a PDP Context causes an IP address to be allocated and assigned to a mobile station which is linked to an Access Point Name (APN) or host system. Such proprietary methods of exchanging IP packets create design problems and challenges when the state or status of one of the entities changes.

Since modern wireless networks utilize an IP protocol for data exchange, at least some capabilities associated with sending asynchronous host or server-initiated messages (i.e. "pushing" data) to mobile stations have been limited and compromised. In a wireless environment, there are many reasons why an attempt to communicate with a mobile station might fail. At any given time, a host attempting to initiate a message to a mobile station has very little knowledge of whether the mobile station is in-coverage or out-of-coverage, whether it has been switched off, whether it is still assigned to the same IP address, or whether an IP data packet has been ever delivered. These problems are exacerbated by the fact that wireless networks treat each mobile station as a "client", which is not well-suited for the returning of status information in host-initiated environments.

Communication failures are generally only communicated between proprietary nodes within the network infrastructure. A protocol referred to as the Internet Control Message Protocol (ICMP) defined by Request For Comments (RFC) 792 by the Internet Engineering Task Force (IETF), for example, provides for the reporting of IP messages that cannot be delivered. In particular, ICMP provides limited feedback to both hosts and mobile stations whenever an actual IP message failure occurs. However, conventional ICMP does not inform a host when the mobile station's state or status changes spontaneously. Such state changes are very common in a wireless environment. For example, a network operator may set timeout values for idle PDP Contexts which may be closed when inactivity timers have expired. Note also that without feedback regarding the termination of a PDP Context, the host often utilizes an incorrect IP address when it attempts to send information to a mobile station. When utilizing dynamic IP address assignment, a previously-assigned IP address may be already reassigned which may result in the wrong mobile station receiving the information from the host.

Accordingly, there is a resulting need for methods and apparatus that overcome the deficiencies of the prior art.

BRIEF DESCRIPTION OF THE DRAWINGS

Embodiments of present invention will now be described by way of example with reference to attached figures, wherein:

FIG. 4 is an exemplary exchange diagram of data exchanges that take place when a Packet Data Protocol (PDP) Context for a mobile station has been lost as identified by a Serving GPRS Support Node (SGSN);

FIG. 5 is an exemplary exchange diagram of data exchanges that take place when a PDP Context for a mobile station has been lost as identified by a Gateway GPRS Support Node (GGSN)

DETAILED DESCRIPTION OF THE PREFERRED EMBODIMENTS

In one illustrative example of the techniques described herein, a method of reducing undeliverable server-initiated IP traffic within a wireless communication network includes the steps of identifying that a data connection for communicating server-initiated IP messages from a host server to a mobile station has been lost or terminated; causing a notification message having a destination address corresponding to the host server to be produced based on identifying that the data connection has been lost or terminated; and causing the notification message to be sent to the host server. The notification message may cause the host server to at least temporarily refrain from communicating and/or to queue server-initiated IP messages intended for the mobile station. The notification message may be formatted and communicated based on an existing protocol, such as Internet Control Message Protocol (ICMP), or any other suitable protocol. Advantageously, undeliverable server-initiated IP traffic to mobile stations is reduced within the wireless network.

Figure 1:
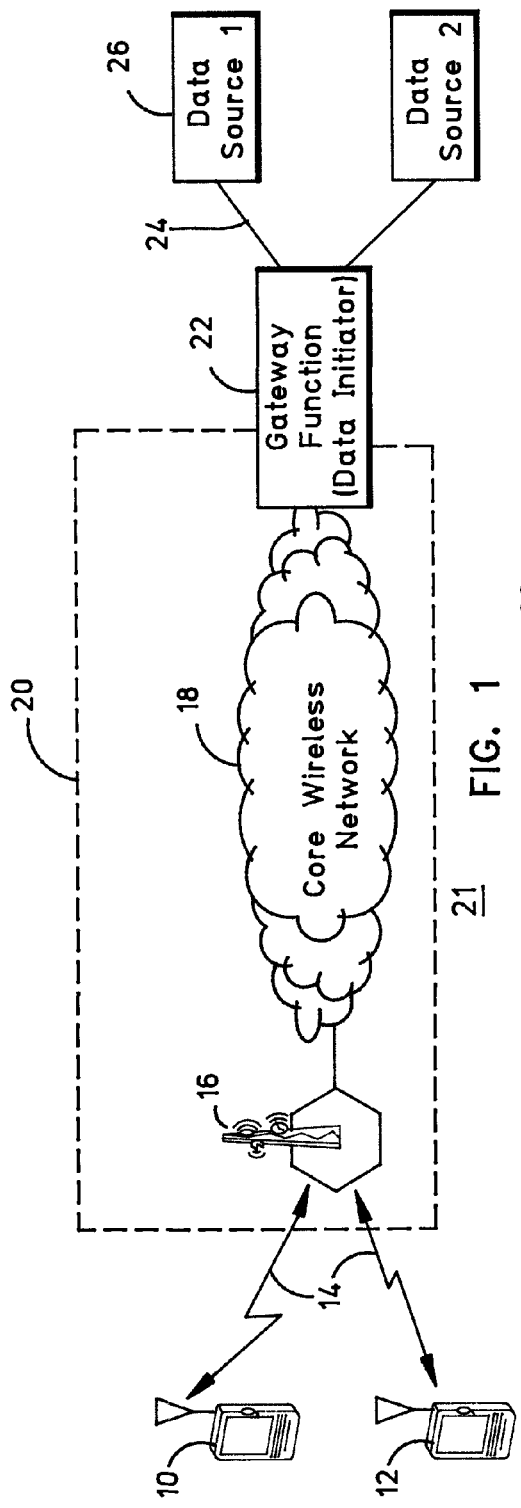
FIG. 1 is a block diagram showing an exemplary wireless system which includes a wireless network having a core wireless network infrastructure.

Referring to FIG. 1, a block diagram of an exemplary wireless system 21 which includes a wireless communication network 20 having a core wireless network infrastructure 18 and one or more base stations 16 is shown. Base stations 16 communicate with mobile stations 10, 12 over a wireless link 14 utilizing radio frequency (RF) protocols. Examples of such RF protocols include Code Division Multiple Access (CDMA), Time Division Multiple Access (TDMA), and Frequency Division Multiple Access (FDMA) radio protocols used in virtually all wireless networks. Core wireless network infrastructure 18 is responsible for all other network functions including authentication, routing, provisioning, and IP address management.

One or more data sources 26 are the initiators of data to be "pushed" to mobile stations 10, 12. In FIG. 1, there are two data sources shown but several additional data sources may be utilized. Server-initiated IP messages are sent from data source 26 to mobile stations 10, 12 after an initial setup for mobile stations 10, 12. Data source 26 may be a specific application server for mobile stations 10, 12 which may be referred to as a host system or server. Data that are "pushed" asynchronously from data source 26 to mobile stations 10, 12 may include electronic mail (e-mail) message data, stock data, specialized call dispatch data, customer data, weather data, sports data, calendar or schedule data, and a wide-range of other data types. Such data are regularly sent and received substantially in "real-time" by mobile stations 10, 12. Mobile stations 10, 12 may visually display and otherwise utilize the data as appropriate.

A gateway function 22, which may include one or more gateway servers or processors, is provided for interconnection functions between mobile stations 10, 12 and non-wireless network components (e.g. data source 26). The interconnection features of gateway function 22 include the routing traffic from a private IP domain within wireless network 20 to the public domain of the Internet, authorizing mobile stations 10, 12 to use particular gateway functions, and providing an asynchronous "push" mechanism for data previously requested by mobile stations 10, 12. In an exemplary embodiment, data source 26 and gateway function 22 are connected through an Internet connection 24 in FIG. 1.

A "host server" referred to herein may be an application server (e.g. data source 26) that initiates push communications to mobile stations, or an intermediate server such as gateway function 22 which manages one or more push application servers (e.g. data source 26) for providing subscriber services for mobile stations 10, 12. In this context, gateway function 22 may include a Wireless Access Protocol (WAP) server, a push-proxy server, or what is referred to in the industry as a push function for mobile stations 10, 12.

Figure 2:
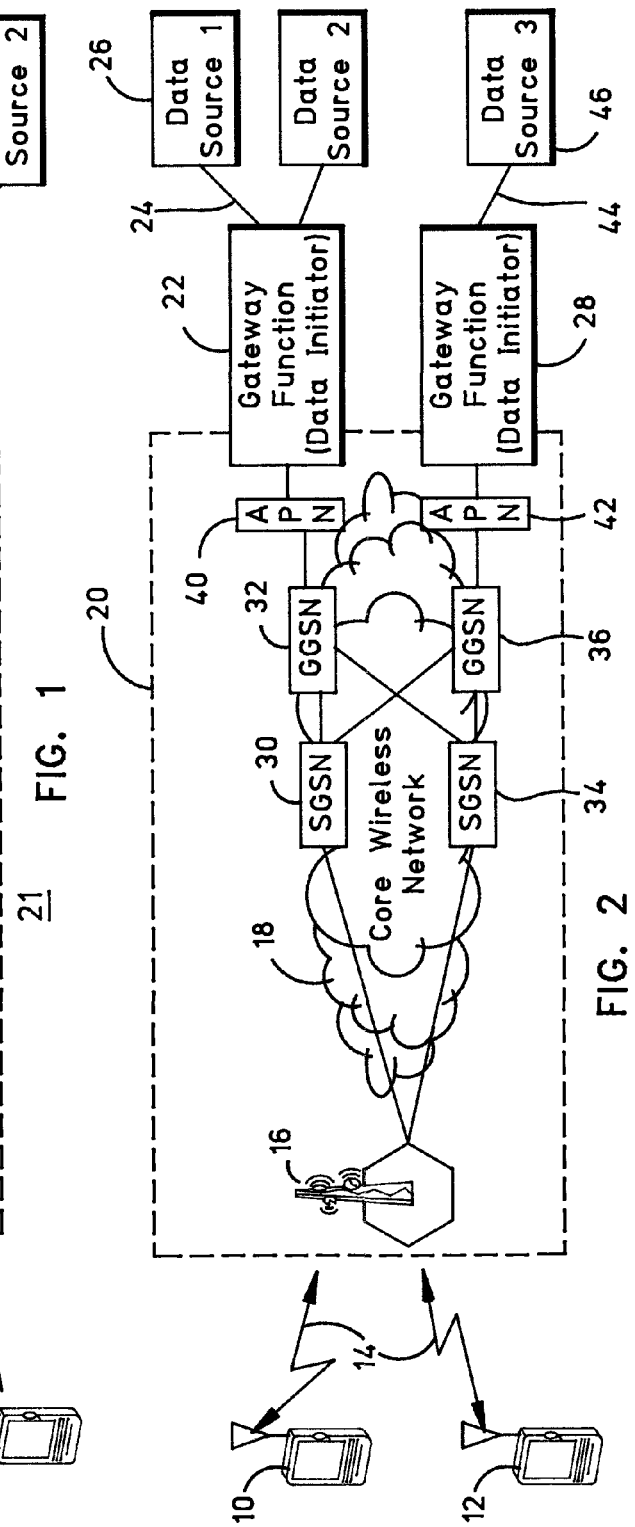
FIG. 2 is an expanded block diagram of the wireless system of FIG. 2.

In FIG. 2, there is shown an expanded version of wireless system 21 of FIG. 1 which operates based on Global Systems for Mobile Communications (GSM) and General Packet Radio Service (GPRS) standards. Core wireless network infrastructure 18 in FIG. 2 reveals routing and operational nodes, specifically, Serving GPRS Support Nodes (SGSNs) 30, 34 and Gateway GPRS Support Nodes (GGSNs) 32, 36. SGSNs 30, 34 and GGSNs 32, 36 may include conventional components such as computer processors and/or servers. GGSNs 32, 36 are wireless network gateways and therefore include wireless network gateway processing and/or servers.

As understood by those skilled in the art, this is not an exhaustive depiction of all components within a GSM/GPRS, Universal Mobile Telephone Service (UMTS), or Enhanced Data Rates For GSM Evolution (EDGE) type network, but rather just the primary components involved in routing and managing information for mobile stations 10, 12 pertinent to this discussion. Although the present embodiment relates to GSM/GPRS, it is clear to one skilled in the art that network components for CDMA, iDEN, UMTS, EDGE, etc. may be utilized as alternatives. Specifically, for example, a Packet Data Serving Node (PDSN) of a CDMA network (e.g. cdma2000) may be utilized to produce and cause the notification messages to be sent to the host server. Note also that the version of IP protocol utilized (i.e. IPv4 or IPv6) has no effect on the techniques of the present application.

Core wireless network infrastructure 18 of FIG. 2 also includes Access Point Names (APNs) 40, 42 to identify which appropriate gateway function 22, 28 should be utilized. This is necessary in order to allow mobile stations 10, 12 to select different gateway functions 22, 28, and thus different IP networks 24, 44 and different data sources 26, 46. In general, APNs 40, 42 act as end-point identifiers, routing address and provisioning points for mobile stations 10, 12 to communicate with entities outside of wireless network 20. APNs 40, 42 are qualified similar to Internet domain names (i.e. by label.label.label string). They are used in the network to determine which GGSN 32, 36 and therefore which IP network 24, 44 mobile stations 10, 12 need to access. However, APNs 40, 42 have no IP address and act as simple routers which take the information provided by either mobile stations 10, 12 or gateway functions 22, 28 and route it appropriately through wireless network 20.

As part of a provisioning process, each mobile station 10, 12 is associated with one or more APNs 40, 42 in a mapping table. SGSNs 30, 34 manage such mapping table information within core wireless network infrastructure 18 and subsequently use it to select which GGSN 32, 36 to route information to for a given mobile station 10, 12. The mapping table stores a permanent identifier (e.g. a subscriber ID) for each mobile station 10, 12, a current dynamically-assigned IP address associated therewith, and one or more APN addresses associated therewith.

During normal operation, GGSNs 32, 36 receive one or more server-initiated IP messages from gateway functions 22, 28 from data sources 26, 46. Intended for mobile stations 10, 12, these messages are forwarded via core wireless network infrastructure 18 to mobile stations 10, 12 over wireless link 14 through base station 16. Note, however, that an error may occur when trying to send such a message to mobile station 10, 12. In these situations, conventional Internet Control Message Protocol (ICMP) is used to report a specific failure to send the message. This is insufficient, however, and direct feedback regarding data connection status of mobile stations 10, 12 is needed.

Using techniques of the present application, the data connection status of mobile stations 10, 12 is provided. Broadly, a data connection for communicating server-initiated IP messages from a host server to a mobile station is identified to be lost or terminated. The host server may be an application server (e.g. data source 26 or 46) that initiates push communications to mobile stations, or an intermediate server such as gateway function 22 (WAP Server, Push-Proxy Server, or Push Function) which manages one or more push application servers (e.g. data source 26) for providing subscriber services for mobile stations 10, 12. The data connection may be identified to be lost or terminated by GGSNs 32, 36, for example. In response to such identification, a notification message having a destination address corresponding to the host server is produced and sent immediately to the host server. The notification message is indicative of the lost or terminated data connection. The notification message may cause the host server to at least temporarily refrain from communicating and/or to queue pending or future server-initiated IP messages intended for the mobile station. This way, undeliverable server-initiated IP traffic to mobile stations is reduced within the wireless network.

Figure 3:
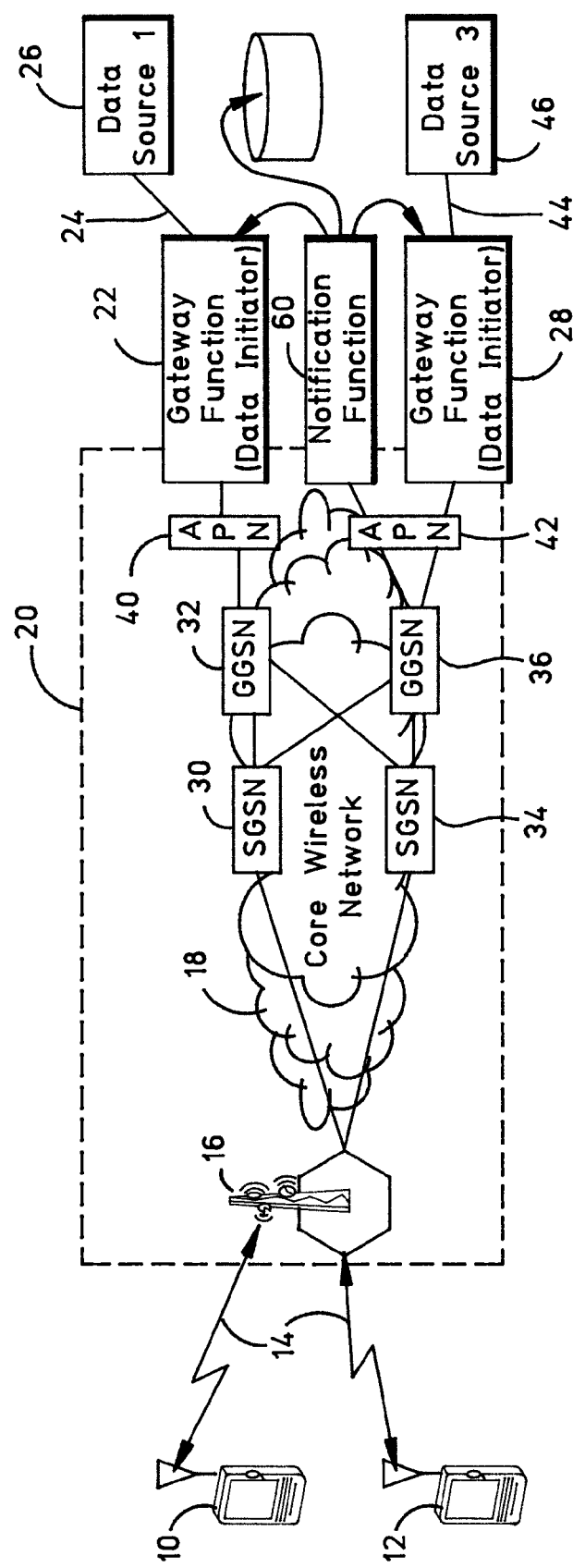
FIG. 3 is an expanded block diagram of the wireless system of FIG. 2 including a notification function entity.

In FIG. 3, there is shown a further expanded version of wireless system 21 of FIG. 2 which reveals a notification function 60. Notification function 60 may be included as part of gateway function 28, where in the drawing it has been extracted for greater illustrative clarity. Alternatively, notification function 60 may involve a component separate from gateway function 28 such as a separate notification processor or server. Notification function 60 serves the purpose of managing notifications when data connections for mobile stations 10, 12 become lost or terminated. Thus, in response to a lost or terminated data connection, a notification message is sent to a notification IP address which is managed by notification function 60. In response, notification function 60 updates any components that need to know the information (e.g. one or more host servers for mobile station 10) or simply updates a database for mobile station 10.

An APN provisioning mechanism is used to establish a relationship between APNs 40, 42 and gateway functions 22, 28. This relationship establishes a physical communication path between GGSNs 32, 36 and gateway functions 22, 28 for subsequent communication. To facilitate a notification mechanism, a notification IP address is established within the APN provisioning mechanism. This notification IP address acts as a configured IP path for notification messages that are sent to a given APN.

In the present embodiment, GGSNs 32, 36 are capable of producing notification messages which are indicative of lost or terminated data connections of mobile stations 10, 12. Such notification messages are produced and sent immediately in response to the identification of the lost or terminated data connections. Alternatively, the sending of notification messages may be delayed for a small time period before delivery. In any case, the notification IP address is used as a destination address to an entity (e.g. a host server) that is prepared to act upon it, directly or indirectly. In response to a given notification message, notification function 60 may at least update a local database, send a message to defined gateway functions 22, 28, and/or perform other various activities to ensure better delivery of information to mobile stations 10, 12. It is noted that, in some wireless networks, the need to define the notification IP address may be unnecessary as gateway functions 22, 28 may be reachable directly from a core wireless network node.

Note that a notification message produced for a single terminated data connection may be sent to more than one host server. In this case, the notification message may be viewed as being "broadcasted" to a plurality of host servers associated with a plurality of IP addresses. For example, GGSN 32 may directly broadcast the notification message to a plurality of host servers associated with a plurality of IP addresses. As another example, GGSN 32 may send a single notification message to gateway function 22, which in turn broadcasts the notification message to a plurality of host servers (e.g. data sources 26, 46). As even another example, GGSN 32 may send a single notification message to notification function 60, which in turn broadcasts the notification message to a plurality of gateway functions 22, 28, which in turn may broadcast the notification message to a plurality of additional host servers (e.g. data sources 26, 46). A list of IP addresses is kept stored in a suitable location which depends on the embodiment utilized.

FIG. 4 is a message flow diagram where a data connection for server-initiated messages to mobile station 10 is identified to be lost or terminated. During normal operation, gateway function 22 causes a server-initiated message 100 to be sent to GGSN 32. GGSN 32 routes message 100 to SGSN 30 as a message 102. At this stage, GGSN 32 may have modified the addressing information and perform basic checks on message 100. Each of the networks described earlier will have a similar function to determine that message 100 is valid and correctly formatted. SGSN 30 then identifies the correct base station and routes a message 104 to mobile station 10. This may be performed using a dynamically-assigned IP address that is currently associated with mobile station 10. This process repeats as shown by further message communications 106, 108, and 110.

At some point in time, however, a data connection for sending server-initiated messages to mobile station 10 may become lost or terminated. The data connection may be a Packet Data Protocol (PDP) Context for mobile station 10. Alternatively, the data connection may involve a wireless link between mobile station 10 and the base station. Thus, the data connection may be deemed lost when the PDP Context is terminated, for example, or when mobile station 10 is out-of-coverage with the base station.

Termination of the PDP Context may be initiated by SGSN 30, for example, after a predetermined time period of communication inactivity expires for the PDP Context associated with mobile station 10. In some cases, a dynamically-assigned IP address that was previously associated with the PDP Context is reassigned and given to another mobile station 12. In response to the PDP Context termination, SGSN 30 normally sends a message 122 to GGSN 32 indicating that the PDP Context for mobile station 10 has been deleted 120. The communication of this message 122 may take place, for example, over the GPRS Tunnelling Protocol Control plane (GTP-C) defined in 3GPP specification 29.060. The procedure followed by SGSN 30 is referred to as a "GPRS Detach" procedure or a "GPRS PDP Context Deactivation" procedure. Message 122 may carry a subscriber ID of mobile station 10 and other information, such as the IP address currently associated with mobile station 10. Providing the subscriber ID in the message allows GGSN 32 to update any mapping tables (such as the mapping table which associates mobile station 10 to an APN) to thereby reflect the current connection state of mobile station 10. Message 122 may appear as an SGSN message directed to GGSN 32 with a cause values of IP address release 122. For reference, note that the 3GPP 29.060 specification has a full list of cause values.

In response to message 122, GGSN 32 produces a notification message 124 indicative of the lost/terminated data connection for mobile station 10. GGSN 32 immediately causes notification message 124 to be sent to the host server. The notification message may cause the host server to at least temporarily refrain from communicating and/or to queue pending or future server-initiated IP messages intended for mobile station 10. A mobile station identifier for mobile station 10, such as its subscriber ID or IP address, which is stored at the host server may be deleted so that future messages do not get sent to mobile station 10 using that identifier.

The notification message is IP-based and utilizes the IP address of the host server as the destination address. Specifically, the destination address of the notification message may be derived from the configured notification IP address for APN 40 (FIGS. 2-3). The notification IP address may be managed either by notification function 60 or, alternately, by gateway function 22. It is noted that, in some networks, this additional IP address might not be needed if the network already has the correct IP address for gateway function 22.

In one embodiment, the format and communication of the notification message is specifically based on an Internet Control Message Protocol (ICMP). As a specific example, the notification message is an asynchronous ICMP message having a type value of 3 ("destination unreachable") and a code value of 1 ("host unreachable") to indicate that the PDP Context has been lost/terminated for mobile station 10. Note that other ICMP type and code values can be used other then that described herein. ICMP could be extended to include wireless-specific message types and is not limited to currently-defined ICMP types. In an alternative embodiment, the format and communication of the notification message is not ICMP-based and may utilize any suitable protocol. Preferably, the subscriber ID of the mobile station is included in the notification message. This allows the recipient (e.g. host server) to appropriately update the data connection status of the correct mobile station 10, 12.

FIG. 5 is another message flow diagram where, again, a data connection for server-initiated messages to mobile station 10 is identified to be lost or terminated. Here, GGSN 32 initiates termination of the PDP Context, especially in the situation where the host system established the PDP Context and subsequently wishes to terminate it. The basic steps are the same as FIG. 4, except that GGSN 32 initiates the PDP Context deactivation using the GTP-C protocol with SGSN 30. This procedure is called the "PDP Context Deactivation Initiated by GGSN" procedure. After deletion 130 of the PDP Context for mobile station 10, GGSN 32 causes a GTP message 132 to be sent to SGSN 30. Thereafter, GGSN 32 causes a notification message 134 to be sent to the host server identified by the notification IP address.

Note that there are a wide variety of additional or alternative error conditions in the networks where a notification message may be produced and delivered in accordance with the present techniques. Some of these additional conditions may include situations where the mobile station is GPRS-detached; the mobile station has initiated the shutdown of the PDP Context (similar to examples shown in FIG. 4 and FIG. 5); the mobile station is not GPRS-responding, the mobile station is turned off, battery has died, or has been out-of-coverage for an extended period of time; the mobile station refuses; the mobile station is having internal problems (e.g. perhaps it has run out of resources but it is refusing to accept messages through the PDP Context); little or no resources are available; the network is having spontaneous resource issues (allows hosts to temporarily refrain from utilizing resources until they are available); a system failure; the network is experience a system failure which could effect data transfer (allows hosts that are trying to send to back-off until systems are repaired); the GPRS connection is suspended or temporarily suspended; data traffic is affected; and the PDP Context not found, lost, or no longer available.

Figure 6:
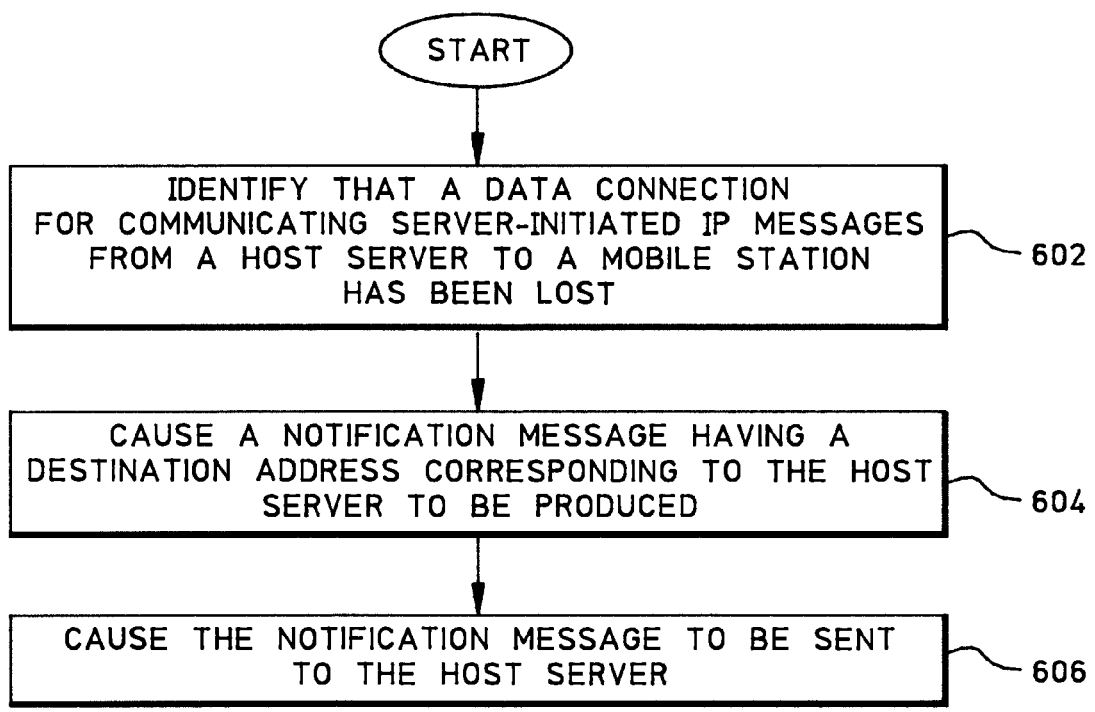
FIG. 6 is a flowchart for summarily describing the general method of reducing undeliverable server-initiated IP traffic to mobile stations within the wireless network.

FIG. 6 is a flowchart which summarily describes a general method of reducing undeliverable server-initiated IP traffic within the wireless communication network. This method may be implemented as computer software instructions which are stored on a storage medium (e.g. memory, computer disk, CD-ROM, etc.) and executed at least in part by a gateway processor or server (e.g. in a GGSN) in a wireless communication network. Before the method of FIG. 6, a mobile station is operating in a wireless communication network and is receiving server-initiated IP messages from a host server over a data connection. The server-initiated IP data may include, as examples, e-mail messages, real-time stock quotes, real-time weather information, etc., which are visually displayed and otherwise usable at the mobile station.

Beginning at a start block of FIG. 6, the data connection for communicating the server-initiated IP messages from the host server to the mobile station is identified to be lost or terminated (step 602). The data connection may be a Packet Data Protocol (PDP) Context or a wireless data link, for example. In response to identifying that the data connection has been lost or terminated, a notification message having a destination address corresponding to the host server is produced (step 604). The host server may be the application server that initiates such push communications to the mobile station, or an intermediate server such as a gateway server (WAP, push-proxy, or push function) which manages one or more application servers on behalf of the mobile station for subscriber services.

The notification message is an IP message which is routable in the wireless network. In particular, the notification message may be formatted and communicated based on an Internet Control Message Protocol (ICMP) or other suitable protocol. If the data connection that was lost or terminated is a PDP Context, the notification message may be referred to as a PDP Context State Notification. In any case, the notification message is immediately sent to the host server (step 606). Upon its receipt, the notification message may cause the host server to at least temporarily refrain from communicating and/or to queue server-initiated IP messages intended for the mobile station. A mobile station identifier, such as its subscriber ID or IP address, which is stored at the host server may be deleted so that future messages do not get sent to the mobile station using that identifier. Other suitable responses by the host server may be performed in addition to or in lieu of the above-mentioned responses.

Final Comments. Methods and apparatus for reducing undeliverable server-initiated IP traffic in a wireless communication network have been described. One illustrative method includes the steps of identifying that a data connection for communicating server-initiated IP messages from a host server to a mobile station has been lost; causing a notification message having a destination address corresponding to the host server to be produced based on identifying that the connection is lost; and causing the notification message to be sent to the host server. The notification message may cause the host server to at least temporarily refrain from communicating and/or to queue server-initiated IP messages intended for the mobile station. The notification message may be based on an Internet Control Message Protocol (ICMP) or other suitable protocol.

A wireless network gateway of the present application includes a gateway processor; a storage medium; and computer instructions stored in the storage medium. The computer instructions may be executable by the wireless network gateway processor for reducing undeliverable server-initiated IP traffic within a wireless communication network by identifying that a data connection for communicating server-initiated IP messages from a host server to a mobile station in a wireless communication network has been lost; causing a notification message having a destination address corresponding to the host server to be produced based on identifying that the data connection has been lost; and causing the notification message to be sent to the host server.

A wireless communication system of the present application includes one or more base stations; a Serving GPRS Support Node (SGSN) coupled in the wireless communication network for communications with the one or more base stations; and a Gateway GPRS Support Node (GGSN) coupled in the wireless communication network for communications with the SGSN. The GGSN includes a GGSN processor; a storage medium; and computer instructions stored in the storage medium. The computer instructions are executable by the GGSN processor for reducing undeliverable server-initiated IP traffic within the wireless communication system from a host server by identifying that a data connection for communicating server-initiated IP messages from the GGSN server to a mobile station has been lost; causing a notification message having a destination address corresponding to the host server to be produced based on identifying that the data connection has been lost; and causing the notification message to be sent to the host server.

The above-described embodiments of invention are intended to be examples only. Note that the mobile station may be associated with a permanent IP address as opposed to a dynamically-assigned IP address from the network. In addition, although the detailed embodiment relates to GSM/GPRS, it is clear to one skilled in the art that network components for CDMA, iDEN, UMTS, EDGE, etc. may be utilized as alternatives. Specifically, for example, a Packet Data Serving Node (PDSN) of a CDMA network may be utilized to produce and cause the notification messages to be sent to the host server. Alterations, modifications, and variations may be effected to particular embodiments by those of skill in art without departing from scope of invention, which is defined solely by claims appended hereto.

What is claimed is:

1. A method in a host server adapted for connection outside of a wireless communication network for controlling the pushing of data messages to a plurality of mobile communication devices adapted to communicate in the wireless communication network, the method comprising the acts of:
   for each one of the mobile communication devices operating in the wireless communication network: causing, by the host server, data messages to be pushed to the mobile communication device via a packet data connection;
   receiving, in the host server, an IP notification message originating from a serving node in the wireless communication network, the IP notification message having an IP destination address of the host server and including an identification or address that identifies one of the mobile communication devices, the IP notification message being produced in response to a termination of the packet data connection for the identified mobile communication device and indicating that the identified mobile communication device is unavailable to receive data messages; and
   in response to receiving the IP notification message: at least temporarily refraining, in the host server, from pushing data messages to the identified mobile communication device.

2. The method of claim 1, wherein the IP notification message is formatted in accordance with Internet Control Message Protocol (ICMP).

3. The method of claim 1, wherein the IP destination address is configured in an Access Point Name (APN) provisioning mechanism for an APN connected between the wireless communication network and the host server.

4. The method of claim 1, wherein the packet data connection comprises a Packet Data Protocol (PDP) context.

5. The method of claim 1, wherein the termination of the packet data connection comprises a packet service detachment for the identified mobile communication device.

6. The method of claim 1, wherein the wireless communication network operates in accordance with General Packet Radio Service (GPRS), and the serving node comprises a Gateway GPRS Support Node (GGSN).

7. The method of claim 1, comprising the further acts of:
   in response to receiving the IP notification message: at least temporarily queuing subsequent data messages for the identified mobile communication device.

8. The method of claim 1, which is embodied in a storage medium and a computer software instructions stored in the storage medium, where the computer software instructions are executable by one or more processors of the host server for performing the method.

9. A host server which is operative to control the pushing of data messages to a plurality of mobile communication devices adapted to communicate in a wireless communication network, the host server being adapted to cause, for each one of the mobile communication devices data messages to be pushed to the mobile communication device via a packet data connection; receive an IP notification message originating from a serving node in the wireless communication network, the IP notification, message having an IP destination address of the host server and including an identification or address that identifies one of the mobile communication devices, the IP notification message being produced in response to a termination of the packet data connection for the identified mobile communication device and indicating that the identified mobile communication device is unavailable to receive data messages; and in response to receiving the IP notification message, at least temporarily refrain from pushing data messages to the identified mobile communication device.

10. The host server of claim 9, wherein the IP notification message is formatted in accordance with Internet Control Message Protocol (ICMP).

11. The host server of claim 9, wherein the IP destination address is configured in an Access Point Name (APN) provisioning mechanism for an APN connected between the wireless communication network and the host server.

12. The host server of claim 9, wherein the packet data connection comprises a Packet Data Protocol (PDP) context.

13. A method in a gateway for controlling the pushing of data messages between a push application server situated outside of a wireless communication network and a plurality of mobile communication devices adapted to communicate in the wireless communication network, wherein for each one of the mobile communication devices data messages are pushed between the push application server and the mobile communication device via a packet data connection, the method comprising the acts of:
   receiving, in the gateway, an IP notification message originating from a serving node in the wireless communication network, the IP notification message having an IP destination address of the gateway and including an identification or address that identifies one of the mobile communication devices, the IP notification message being produced in response to a termination of the packet data connection for the identified mobile communication device and indicating that the identified mobile communication device is unavailable to receive data messages; and
   in response to receiving the IP notification message: cause the push application server to at least temporarily refrain from pushing user data messages to the identified mobile communication device.

14. The method of claim 13, wherein the IP destination address is configured in an Access Point Name (APN) provisioning mechanism for an APN connected between the wireless communication network and the gateway.

15. The method of claim 13, wherein the IP notification message is formatted in accordance with Internet Control Message Protocol (ICMP).

16. The method of claim 13, wherein the packet data connection comprises a Packet Data Protocol (PDP) context.

17. The method of claim 13, wherein the termination of packet data connectivity comprises a packet service detachment for the identified mobile communication device.

18. The method of claim 13, wherein the wireless communication network operates in accordance with General Packet Radio Service (GPRS), and the serving node comprises a Gateway GPRS Support Node (GGSN).

19. A gateway operative to control the pushing of data messages from a push application server situated outside of a wireless communication network and a plurality of mobile communication devices adapted to operate in the wireless communication network, wherein for each one of the mobile communication devices, data messages are pushed to the mobile communication device via a packet data connection; receive an IP notification message originating from a serving node in the wireless communication network, the IP notification message having an IP destination address of the gateway and including an identification or address that identifies one of the mobile communication devices, the IP notification message being produced in response to a termination of the packet data connection for the identified mobile communication device and indicating that the identified mobile communication device is unavailable to receive data messages; and in response to receiving the IP notification message, causing the push application server to at least temporarily refrain from pushing data messages to the identified mobile communication device.

20. The gateway of claim 19, wherein the IP destination address is configured in an Access Point Name (APN) provisioning mechanism for an APN connected between the wireless communication network and the gateway.

21. The gateway of claim 19, wherein the IP notification message is formatted in accordance with Internet Control Message Protocol (ICMP).

22. The gateway of claim 19, wherein the packet data connection comprises a Packet Data Protocol (PDP) context.

23. The gateway of claim 19, wherein the wireless communication network operates in accordance with General Packet Radio Service (GPRS), and the serving node comprises a Gateway GPRS Support Node (GGSN).

24. The host server of claim 9, wherein the computer instructions are further executable to at least temporarily queue subsequent data messages for the identified mobile communication device in response to receiving the IP notification message.

* * * * *